United States Patent Office 3,610,015
Patented Oct. 5, 1971

3,610,015
APPARATUS AND METHOD FOR EXTRUSION MOLDING
Franz Bollmann, Holzhausen, and Hermann Kroger, Osnabruck, Germany, assignors to Kabel- und Metallwerke Gutehoffnungshutte Aktiengesellschaft, Hannover, Germany
Filed Mar. 19, 1969, Ser. No. 808,535
Claims priority, application Germany, Mar. 20, 1968, P 17 52 007.9
Int. Cl. B21c 23/04, 25/00
U.S. Cl. 72—264                17 Claims

ABSTRACT OF THE DISCLOSURE

Extrusion molding by causing the forming and extrusion flow directing die member to flow with the extruded material.

---

The present invention relates to a method and apparatus for extrusion molding of workpieces, particularly of short tubes with flange.

The material to be used for construction parts and components is often dictated by the conditions of the environment in which they are to be employed. For example, ships, shipyards, ship building equipment and other devices are directly or indirectly subjected to sea water. Chemical industry uses gases and liquids which enhance corrosion of the employed equipment. Metals, if employed at all for such parts and equipment, must be corrosion-proof to a considerable extent.

Corrosion-proof metal, however, is usually very difficult to be deformed. Such a metal is, for example, traded under the name SO–MS–76. Accordingly, working of such material, such as extrusion molding, requires extremely high tool pressure, particularly, for example, if a tube with a flange or the like is to be pressed from such material. The higher the working pressure, the higher is the expenditure required for the tool. For this reason, workpieces made of material which is difficult to be deformed, have in the past frequently been worked by cutting. However, such a method does not permit mass production on an economic basis.

It is an object of the present invention to overcome the difficulties mentioned above, particularly as they arise for extrusion molding of metallic workpieces and particularly in those cases in which the material is supposed to deform opposite to the direction of squeezing. In accordance with the present invention, material is squeezed in a first direction and is caused thereby to flow in a second direction toward a co-acting die element provided for redirecting the flowing material in a third direction. The die element is disposed such as to move also in the third direction at a rate which is at least approximately equal to the rate of flow of the deformed material during the extruding process. Therefore, there is no or little relative motion between the flowing materials and the molding tool engaging and forming the extruded material, and accordingly the friction between material and die tool is avoided. The lack of friction, in turn, facilitates the flow of the material itself during squeezing and extrusion, and it was found that this compounded facilitation in the flow of material so that even with comparatively low die pressure, very difficult deformable material can be deformed to a considerable degree, which heretofore could be extrusion molded only with great difficulties.

For example, in practicing the invention, it is possible to extrude a short tube from an annulus subsequently serving as a flange. Moreover, such article can be manufactured in mass production, without fine finishing of the front faces with which the flanges can be welded to appropriate pipes. Flanges made in accordance with the present invention are, therefore, more easily mountable.

In accordance with the preferred form of practicing the invention, a short tube with flange is made from a metallic disc. At first, a smaller disc is centrally punched out to form an annulus, the punched out small disc serves as part from which to make a smaller tube with flange. Thus, from a single, relatively large disc, a plurality of annuli are sequentially punched from which a plurality of different size tubes are to be extruded. This leads to considerable reduction in cost and economical manufacturing of tubes with flanges of predetermined dimensions.

In order to carry out the method in accordance with the invention, such an annulus is now squeezed axially to provide extrusion in radial direction. A movable mandrel, for example, serves as die and redirects the radially inwardly directed extrusion flow in axial direction to form the tube. The die members squeezing the annulus are constricted such that radial outward extrusion flow is inhibited. The die element redirecting the radially flowing material to flow in axial direction could be moved by means of an additional drive to follow the motion of the flowing material in axial direction. Actually, it was found of advantage to move that die element just slightly faster than the speed of flow of the material so that the flowing material is drawn in the direction of flow. This, of course, requires additional power. It is simpler and more economical if the flow redirecting tube forming part is freely movable in axial direction to be carried along by the flowing material in frictional engagement therewith.

A tube can be formed from a disc to have an inner flange. In this case there is an axially movable collar to be carried along by radially outwardly flowing material.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 2:
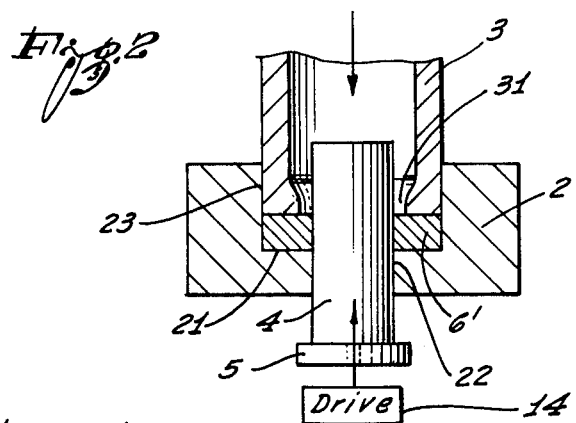
FIG. 2 illustrates in cross sectional view of the die and equipment to be used for forming a short tube with flange from an annulus, whereby the equipment is shown in a first phase of the operation.

Proceeding now to a detailed description of the drawings, turning particularly first to FIG. 2, there is illustrated a first die member 2 having an annular recess 21 forming the die cavity but having at the bottom a concentrical aperture 22. A hollow die punch 3 cooperates with the die member 2 in that die punch 3 can enter recess 21 coaxial thereto to partially close the die cavity, leaving, however, a ring gap 31. The aperture 22 of die member 2 receives a mandrel 4 which is freely movable in axial direction, but having in its lower portion a flange 5 which limits its stroke.

Initially, a disc of the material from which the flange-tube combination is to be formed is placed onto the bottom surface of recess 21 in die 2. In particular, this disc does not have a central aperture. Die punch 3 is lowered to clamp and restrain the disc. In the first step of operation, mandrel 4 is used to punch a central aperture in the disc to form an annulus 6'. The central punched out disc of smaller dimensions, i.e., having diameter given by the diameter of the front face of mandrel 4 is removed. As stated above, this smaller disc is used in a similar tool of smaller dimension to form a flange tube combination of accordingly smaller dimensions.

After a central aperture has been punched in order to make annulus 6', the die punch 3 exerts downwardly directed squeezing force upon the annulus, so that as a consequence of the pressure, the material in annulus 6' begins to flow. The cylindrical wall 23 of recess 21 prevents radial outward flow and the cylindrical surface of mandrel 4 prevents radial inward flow of the material beyond the bounds of the undeformed annulus. However, the gap 31 between die punch 3 and mandrel is an escape path for the squeezed material. Therefore, material is extruded into the gap 31. As the die pressure continues, material flows and is extruded radially inwardly throughout the extension of the annulus, and the mandrel redirects the material to flow upward, i.e., axis parallel along the cylindrical surface of mandrel 4 and into gap 31. The mandrel 4 is now assumed to be freely movable in axial direction. Thus, as the material flows in up direction and in engagement with mandrel 4, the mandrel is carried along in upward direction, i.e., parallel to its cylindrical surface and at essentially the same or almost the same speed as the upwardly flowing material. It can readily be seen that mandrel 4 serves as a barrier for extrusion flow in radial direction and redirects the extruded material in up direction while following the flow in frictional engagement therewith.

As mandrel 4 is freely movable in the aperture 22, the flowing material does not have to overcome friction as the mandrel 4 moves with the engaging material. It is apparent, therefore, that the resistance offered by the material against flow is considerably reduced, and die punch 3 does not have to overcome friction between flowing material and the tube forming die, which is mandrel 4.

Figure 1:
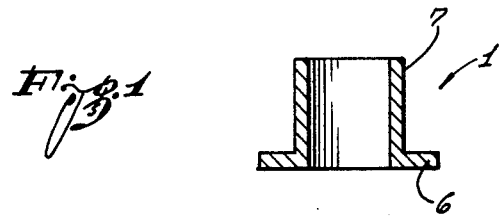
FIG. 1 illustrates a cross sectional view through a flange from which a tube has been extruded in accordance with the present invention.
Figure 3:
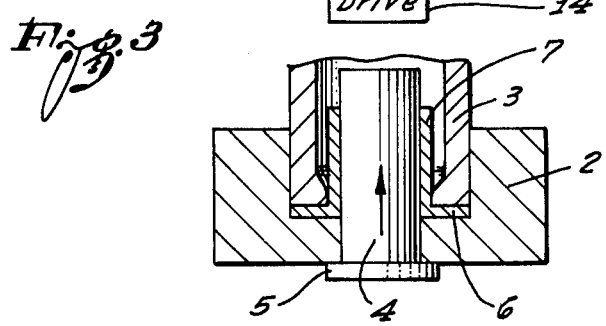
FIG. 3 illustrates the same equipment, shown in FIG. 2, but in an advanced phase of the operation.

It follows from the foregoing that the die pressure causes the material to flow and to carry mandrel 4 for the formation of the tube 7, as shown in FIGS. 1 and 3. The extrusion is stopped when flange 5 abuts die 2 for impeding further up movement of the mandrel. The dimensions, of course, are chosen such that the forming and extrusion molding process is completed by the time flange 5 abutts die 2. FIG. 3 actually illustrates, therefore, that phase of operation. Finally, of course, die punch 3 and mandrel 4 are retracted and the completed tube 7 with integral flange 6 is ejected or otherwise removed from the die.

This embodiment serves also as schematic illustration for a modification already mentioned above. During extrusion, the die member 4 may be coupled to an axial drive 14 (which may have been used during die punching prior to extrusion). The drive 14 is controlled such that die member 4 moves axially up at the rate of the extrusion flow in up direction, or even somewhat faster to draw the flowing material up. This serves as further relief for the sequeezing operation provided by die punch 3.

Figure 4:
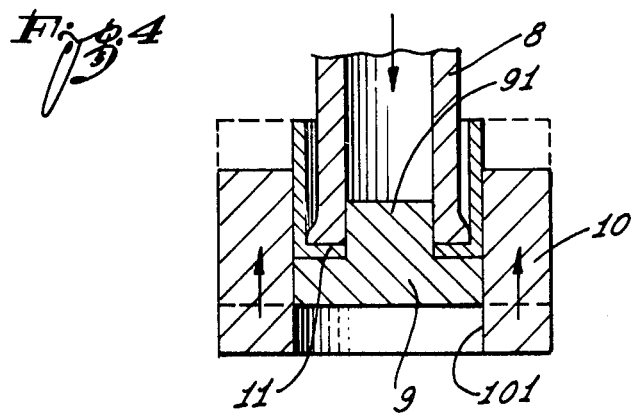
FIG. 4 illustrates modified equipment for practicing the present invention.

The equipment shown in FIG. 4 permits the formation of a tube with integral inwardly extending flange by extrusion of material caused to flow radially outwardly in an annulus. As shown in FIG. 4, there is a die punch 8 cooperating with a die member 9 having an upstanding central portion such as boss 91 leaving an annular bottom 92 for placement of an annular workpiece. As die punch 8 moves down it exerts pressure on the annulus, squeezes the annulus and material is now caused to flow, as stated, radially outwardly to be extruded in up direction along the outer circumference of an annulus 11. The central post 91 serves to restrain radial inward flow and extrusion during squeezing of the annulus.

Now, in accordance with this particular aspect of the invention, there is provided a collar 10, the inner cylindrical surface 101 of which circumscribes die element 9. This cylindrical element 10 prevents radial outward flow of the material beyond the initial periphery and redirects the material flow in up direction and collar 10 is freely movable in axial direction, frictionally engages the up flowing material and forms the extruded tube. After the cylinder 10 has assumed the position illustrated in dotted lines, the process is completed and again a particular tube flange combination can be removed.

As one can see from FIG. 4, the extruding operation can be preceded by a punching operation in that the boss 91, together with the hollow die 8, coact as a pair of die punches to punch out a central disc from the original disc 11 to form an annulus from which subsequently the short tube is axially extruded along the outer periphery as outlined above.

The invention is not limited to the embodiments described above but all changes and modifications thereof not constituting departures from the spirit and scope of the invention are intended to be included.

We claim:

1. Method of extruding a tube from an apertured metallic disk to form a flanged tube, comprising the steps of:
providing a stationary, recessed die member and a ram movable relative to the die member in a first direction, placing the disk into the recessed die member, to be positioned axially on the first direction, and providing a concentric follower member with cylindrical surface in radial engagement with the disk to establish a radial flow barrier;
squeezing the apertured disk in a first axial direction by means of the ram to extrude material from the workpiece in a second, radial direction transverse to the first direction towards the barrier; and
redirecting the extruding material into a third direction transverse to the second direction and opposite to the first direction, so that a tube is formed on the disk through flow of material through a gap between the ram and the follower member and the redirecting being carried out by the follower member as engaging the extruded material, whereby
the follower member follows the motion of the extruded material in the third direction at a speed substantially similar to the flow speed of the material as flowing in the third direction.

2. The method as set forth in claim 1 and including the step of driving the follower member for motion in the third direction at said flow speed to obtain release of the follower member.

3. The method as set forth in claim 1, the follower member being freely movable in the third direction to follow the flow of material by frictional engagement therewith.

4. The method as set forth in claim 1, the redirecting step including the steps of inhibiting the flow in radial outward direction and of causing the material to flow axially from the inner periphery of the disk in engagement with a cylindrical die moving axially through the aperture of the disk.

5. The method as set forth in claim 1, the redirecting step including the steps of inhibiting the flow in radial inward direction and of causing the material to flow axially from the outer periphery of the disk in engagement with an annular die moving axially along the periphery of the disk.

6. The method as set forth in claim 1 preceded by the step of retaining a disc in a particular position and stamping out a central disc portion to provide an annulus.

7. The method as set forth in claim 6, the squeezing steps being a continuation of the retaining step.

8. A method as set forth in claim 1 and including the steps of retaining the workpiece in a particular position and stamping the workpiece to provide particular contour prior to the squeezing steps:
the redirecting step operating transverse to the contour of the workpiece.

9. Equipment for forming metallic workpieces by extrusion molding, comprising:

means including a stationary die and a ram movable in a first direction for squeezing an annulus in the first direction to extrude material from the annulus in a second radial direction transverse to the first direction; and a die means movable opposite to the first direction for engaging the extruded material to redirect the extruded material in a third direction transverse to the second direction, opposite to the first direction, the die means being disposed to follow the motion of the extruded material in the third direction at a speed substantially similar to the flow speed of the material as redirected to flow in the third direction.

10. Equipment as set forth in claim 9, the die means being a mandrel freely movable in an axial direction.

11. Equipment as set forth in claim 10, the mandrel constructed as a punch to form an annulus by centrally punching a disc, the first and second die members serving as retaining means for the punching.

12. Equipment as set forth in claim 9, the die means including a collar disposed coaxially to the axis of the annulus, the third direction being axis parallel, the second direction being radially outward from the axis.

13. Equipment as set forth in claim 9, the die means including a mandrel, there being means for positioning the mandrel for free movement in the third direction.

14. The method of extruding a tube from an annular metallic disk having diameter dimensions larger than axial dimensions and inner and outer peripheries, comprising the steps of:

providing an axially movably die member with cylindrical surface in engagement with one of the inner and outer peripheries of the disk;

providing a stationary barrier for radial extrusion flow in engagement with the other one of the inner and the outer peripheries of the disk; and squeezing the disk axially by means of a ram movable in axial direction and over the axially facing area of the disk except for a narrow annular area extending along the one periphery, there being a gap between the movable die member and the ram, to obtain radial extrusion flow throughout the disk toward the one periphery, the flow redirected by the movable die member into the gap, in engagement with the member, to move the member axially opposite to the axial direction of squeezing by the ram and in unison with the axially redirected extrusion flow.

15. The method as in claim 14, for providing a tube with a radially outwardly directed flange, the movable die member being a mandrel in and along the inner periphery of the disk, the extrusion flow being radially inwardly directed and axially redirected by the movable mandrel.

16. The method as in claim 14, for providing a tube with a radially inwardly directed flange, the movable die member being a cylindrical collar on and along the outer periphery of the disk, the extrusion flow being radially outwardly directed and axially redirected by the movable collar.

17. The method as in claim 14, including the imparting of load relief motion upon the movable member to support the axial movement thereof upon axially redirected extrusion.

References Cited
UNITED STATES PATENTS

| 95,850 | 10/1869 | Tatham | 72—264 |
| 2,965,228 | 12/1960 | Scribner | 72—273 X |

FOREIGN PATENTS

| 258,083 | 9/1926 | Great Britain. | |
| 370,274 | 4/1932 | Great Britain | 72—260 |
| 570,954 | 1/1943 | Great Britain | 72—260 |
| 1,134,953 | 10/1958 | Germany | 72—260 |
| 937,283 | 1/1956 | Germany. | |

CHARLES W. LANHAM, Primary Examiner

R. M. ROGERS, Assistant Examiner

U.S. Cl. X.R.

72—73